US011204891B2

United States Patent
Abe et al.

(10) Patent No.: US 11,204,891 B2
(45) Date of Patent: *Dec. 21, 2021

(54) IDENTIFYING PARTIAL UPDATE FOR TAPE FILE SYSTEM

(71) Applicant: International Business Machines Corporation, Armonk, NY (US)

(72) Inventors: Atsushi Abe, Ebina (JP); Tohru Hasegawa, Tokyo (JP); Hiroshi Itagaki, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 892 days.

This patent is subject to a terminal disclaimer.

(21) Appl. No.: 15/343,313

(22) Filed: Nov. 4, 2016

(65) Prior Publication Data

US 2018/0129667 A1 May 10, 2018

(51) Int. Cl.
| | |
|---|---|
| *G06F 16/10* | (2019.01) |
| *G06F 16/11* | (2019.01) |
| *G06F 3/06* | (2006.01) |
| *G06F 16/18* | (2019.01) |

(52) U.S. Cl.
CPC .......... *G06F 16/122* (2019.01); *G06F 3/0604* (2013.01); *G06F 3/0611* (2013.01); *G06F 3/0643* (2013.01); *G06F 3/0659* (2013.01); *G06F 3/0682* (2013.01); *G06F 16/18* (2019.01)

(58) Field of Classification Search
CPC ..................... G06F 17/30082; G06F 17/30182
USPC .......................................................... 707/696
See application file for complete search history.

(56) References Cited

U.S. PATENT DOCUMENTS

| | | | |
|---|---|---|---|
| 7,200,720 B1* | 4/2007 | Yang .................... | G06F 16/2308 711/141 |
| 8,832,365 B1 | 9/2014 | Sims et al. | |
| 9,063,666 B2 | 6/2015 | Amir et al. | |
| 9,430,155 B2* | 8/2016 | Amir ..................... | G06F 3/0611 |
| 2007/0283078 A1* | 12/2007 | Li ........................ | G06F 12/0866 711/103 |
| 2011/0238906 A1 | 9/2011 | Amir et al. | |
| 2012/0265836 A1* | 10/2012 | Nemoto ............ | G06F 17/30153 709/211 |

(Continued)

OTHER PUBLICATIONS

Abe et al., "Identifying Partial Update for Tape File System", U.S. Appl. No. 15/892,629, filed Feb. 9, 2018.

(Continued)

*Primary Examiner* — Jau Shya Meng
(74) *Attorney, Agent, or Firm* — Mark Bergner

(57) ABSTRACT

A request to open a file from a plurality of files in a storage is received from an application. The storage is made up of an index partition, containing recordings of file system indexes, and a data partition, containing recordings of the indexes and the file system data body. A file descriptor is created with an update flag that references the file. A determination is made that the file is being updated by the application, and the update flag is set to a value representing that the file is being updated. A request to write an index of the file system is received. A determination is made whether a specific file from the plurality of files is being updated. The index is written to the storage with an extended attribute for the specific file indicating that the specific file was being updated at the time the index was written.

14 Claims, 6 Drawing Sheets

(56) References Cited

U.S. PATENT DOCUMENTS

| | | |
|---|---|---|
| 2015/0046645 A1 | 2/2015 | Iwanaga et al. |
| 2015/0095566 A1 | 4/2015 | Itagaki et al. |
| 2015/0161161 A1 | 6/2015 | Iwanaga et al. |
| 2015/0363459 A1* | 12/2015 | Kadoda ............... G06F 16/1734 707/736 |
| 2017/0125061 A1 | 5/2017 | Ashida et al. |
| 2018/0018238 A1* | 1/2018 | Tomii .................. G06F 11/1435 |
| 2018/0165292 A1 | 6/2018 | Abe |

OTHER PUBLICATIONS

List of IBM Patents or Patent Applications Treated as Related, dated Feb. 8, 2018, pp. 1-2.
Accelerated Examination Support Document, dated Jan. 29, 2018, 22 pages.
Brume, S., "Optimizing LTFS Usage", IBM Corporation, 11 pages.

* cited by examiner

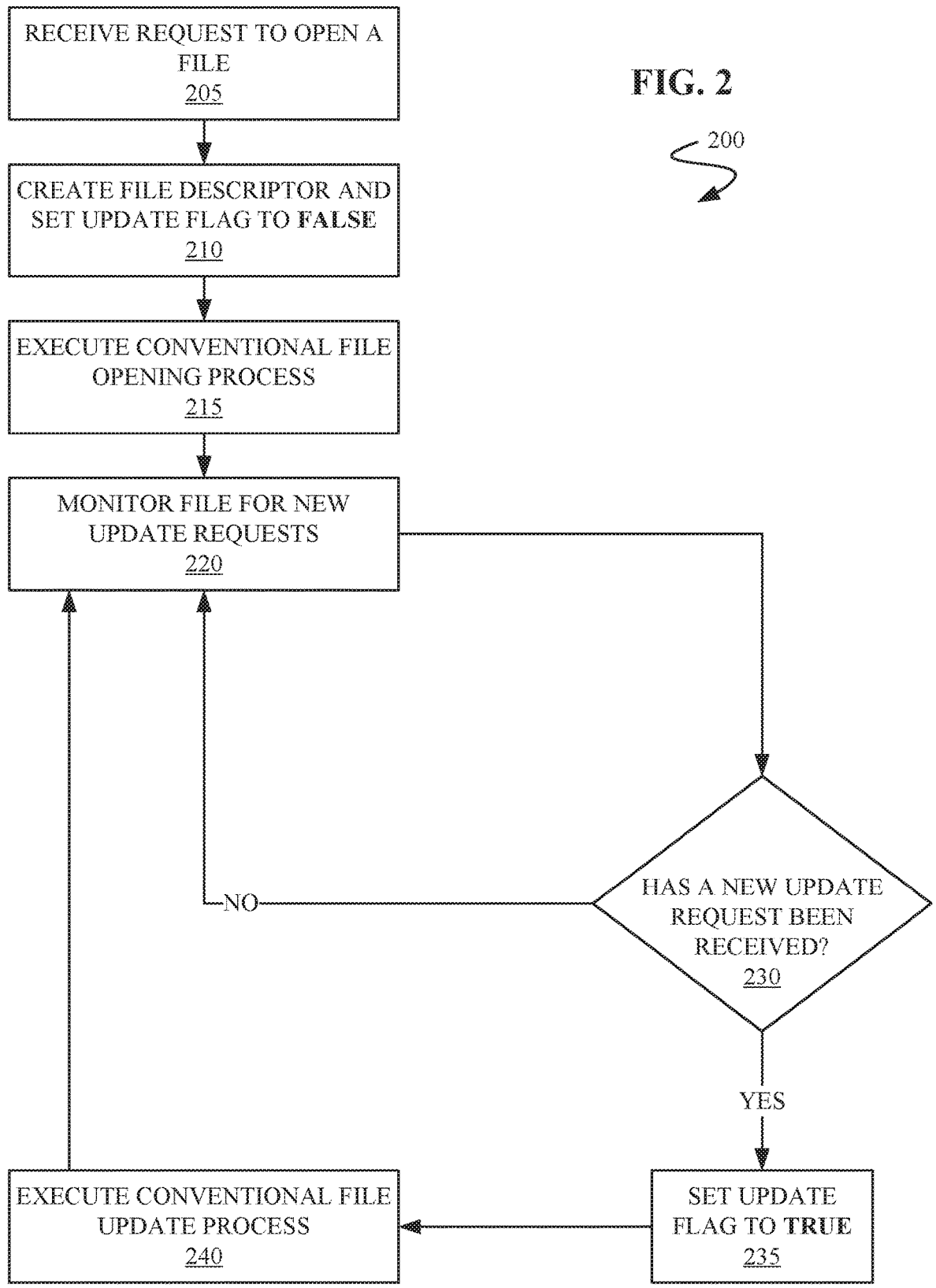

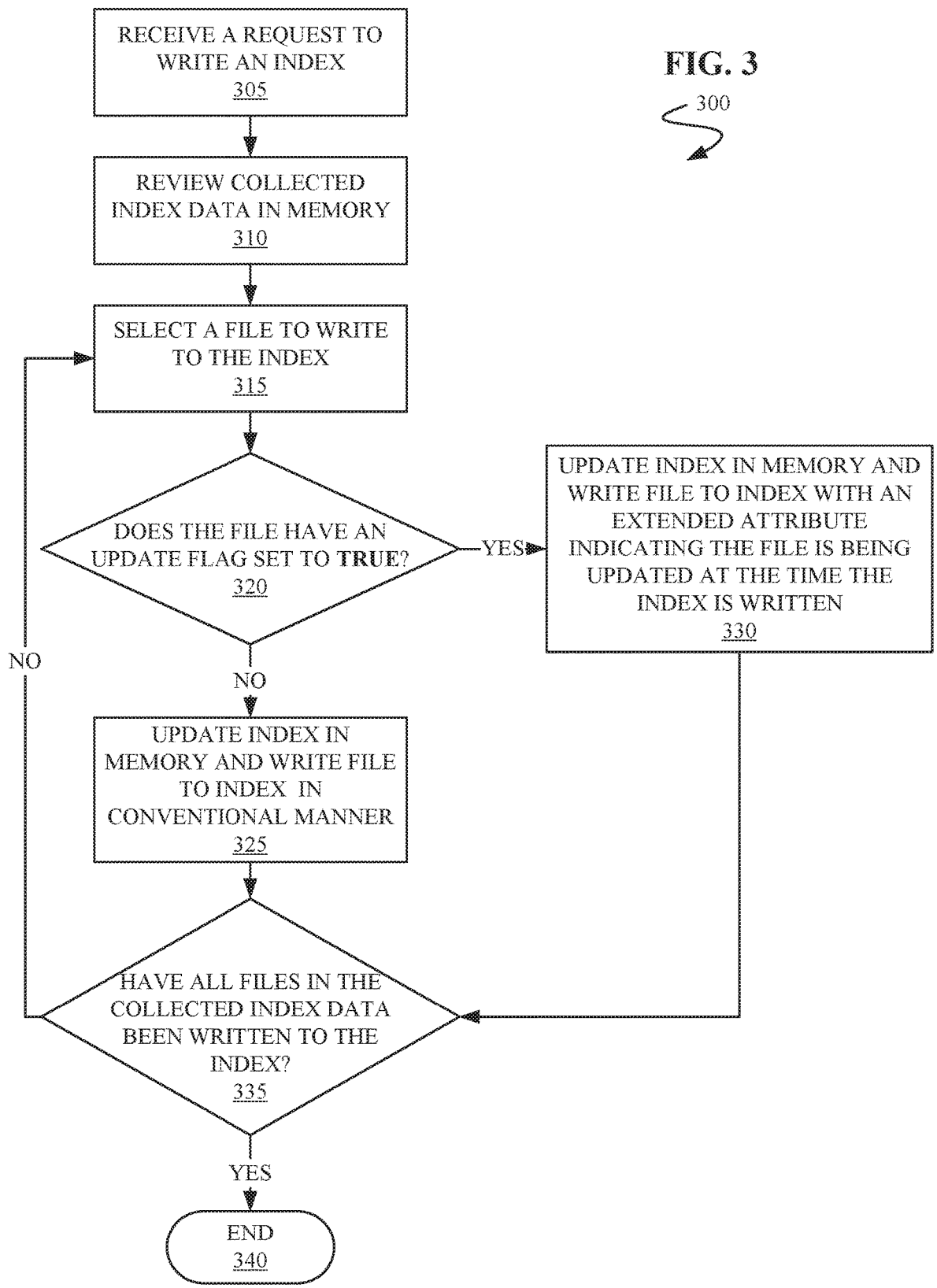

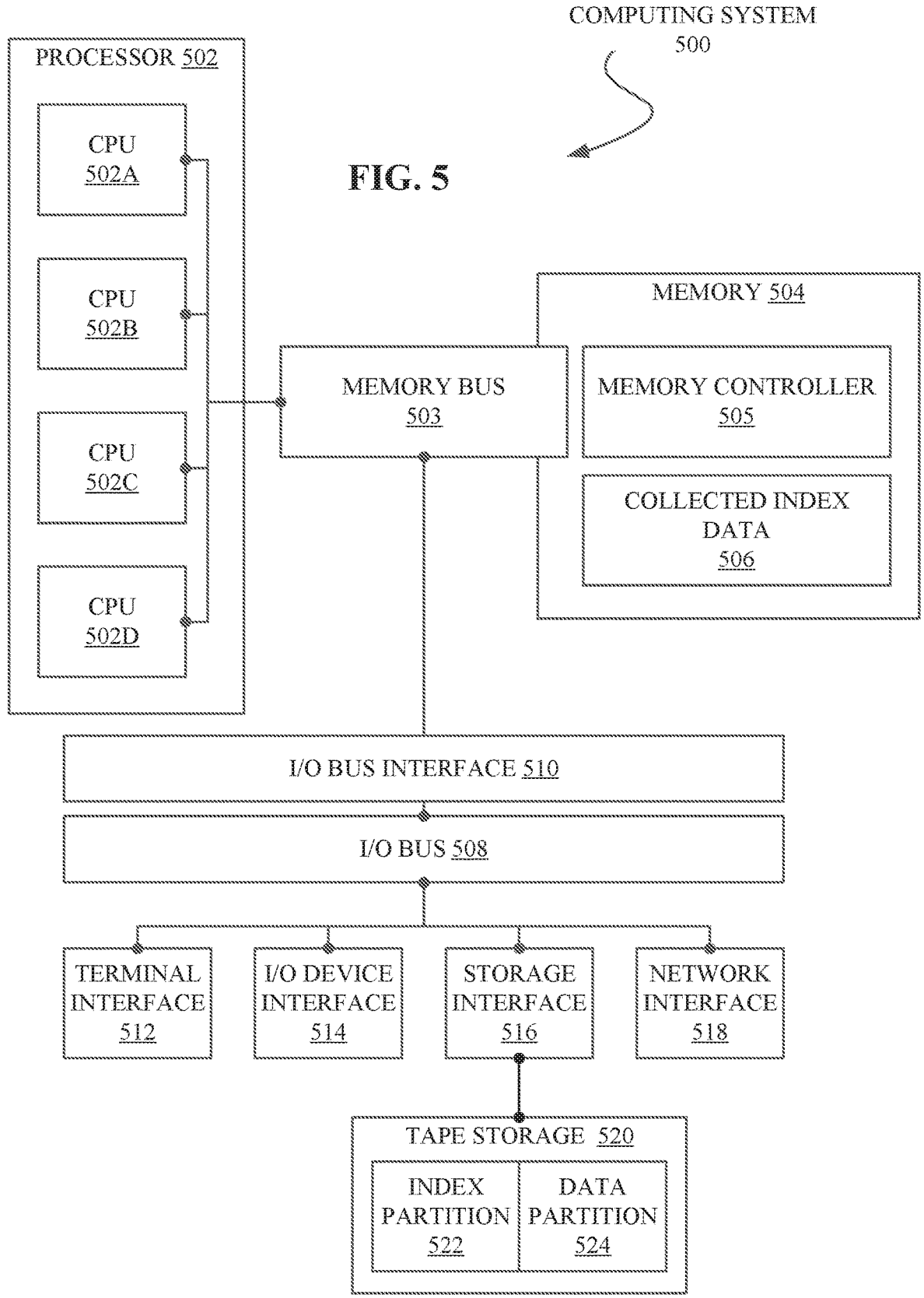

IDENTIFYING PARTIAL UPDATE FOR TAPE FILE SYSTEM

BACKGROUND

The present disclosure relates to writing an index in a file system, and more specifically, to writing an index in a linear tape file system (LTFS).

LTFS is an open standard format which allows for files stored on a magnetic tape to be accessed similarly to files on a disk or flash drive. In accordance with the LTFS format, the tape is divided into two partitions: an index partition and a data partition. The index partition is generally configured to store metadata, such as file allocation information, and the data partition is configured to store the body of the data.

While the file allocation information in a LTFS index partition is frequently updated, data is always appended to the tape (which is called a sequential access device). When data is recorded in a partition, the associated allocation information is recorded at the end thereof (in the data partition). To prevent lengthy mount times while the rearmost information is read when a tape is mounted, LTFS calls for the index to be overwritten and recorded to the beginning portion of the index partition in response to unmounting the tape. This makes it possible to always read the most recent index data from the index partition when mounting the tape.

SUMMARY

According to embodiments of the present disclosure, a computer-implemented method for writing indexes in a storage of a file system is described.

The method may begin by receiving, from an application, a request to open a file from a plurality of files in the storage. The storage may be made up of an index partition and a data partition, with indexes of the file system recorded to the index partition and the indexes and data body of the file system recorded to the data partition in an appending manner. A file descriptor may be created for the file, which may include an update flag that references the file.

A determination is made that the file is being updated by the application and, in response, the update flag in the file descriptor is set to a value representing that the first file is being updated.

The method may further involve receiving a request to write an index of the file system. In response to receiving the request to write the index, a determination may be made whether a specific file from the plurality of files is being updated.

In response to determining that the specific file is being updated, an index is written to the storage including an extended attribute for the specific file indicating that the specific file was being updated at the time the index was written.

Further disclosed herein are a computer system and computer program product for performing the method. The computer system can comprise a storage having an index partition and a data partition, a memory configured to store collected index data, and a processor in communication with the memory and the storage. The computer program product can comprise a computer readable storage medium embodying program instructions for the execution of the method disclosed herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 2 depicts an example method of a process for flagging a data file engaged in an update process, in accordance with embodiments of the present disclosure.

FIG. 3 depicts an example method for writing an index to the tape file system, in accordance with embodiments of the present disclosure.

FIG. 5 depicts a high-level block diagram of an example computer system that may be used in implementing one or more of the methods or modules described herein, in accordance with embodiments of the present disclosure.

Figure 1A:
FIG. 1A depicts an example of a tape which does not have the most recent index written to the index partition.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to writing an index in a file system, more particular aspects relate to writing an index in a linear tape file system (LTFS). While the present disclosure is not necessarily limited to such applications, various aspects of the disclosure may be appreciated through a discussion of various examples using this context.

According to the format of LTFS, when a new index is written to the index partition, it is also written into the data body of the data partition. This allows the tape to be mounted based on the index recorded in the data partition, if necessary, though it requires additional time. The index in the data partition provides an alternative option for loading the tape, for scenarios such as a sudden power stoppage, which prevents the index in the index partition from being updated, or a roll back scenario, where an earlier index than the most recent index is deliberately accessed. Some LTFS products may provide a function wherein an index is written to the data partition at a user-called time or periodically in a predetermined interval to mitigate the data loss in the event of a sudden power stoppage or to provide more control points for roll back access. For instance, FIG. 1A depicts an example of a tape which does not have the most recent index written to the index partition, perhaps due a sudden power stoppage, as opposed to FIG. 1B, which depicts a preferable scenario where a final index (INDEX 3) is written and stored to the index partition.

Figure 1B:
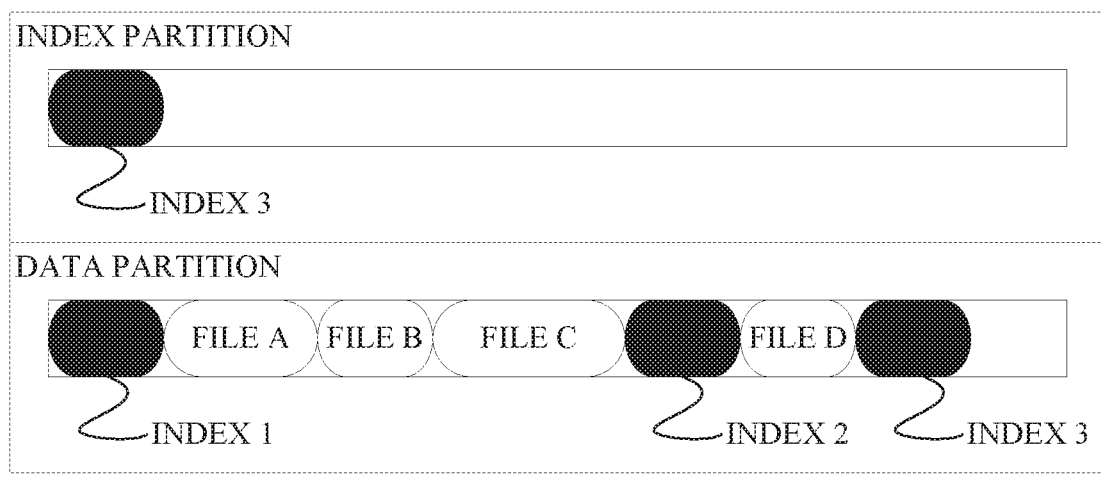
FIG. 1B depicts a tape with a final index written and stored to the index partition.
Figure 1C:
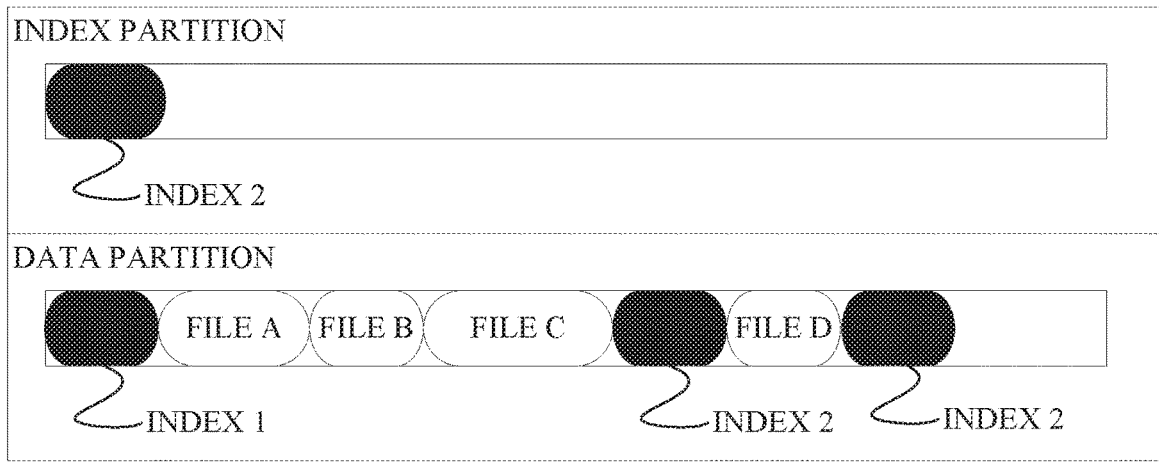
FIG. 1C depicts an example of a tape restored from an index.

In a scenario such as depicted in FIG. 1A, a recovery program may be utilized to restore the tape to a proper LTFS format, such that INDEX 2 would be written at the beginning of the index partition. The recovery program may further be able to restore files stored before INDEX 2, which is the last written index. An example of this is shown in FIG. 1C. While FIG. 1A portrays how the tape may appear following the power loss, with INDEX 2 written to the data partition but not updated to the index partition, FIG. 1C portrays how the tape may appear following recovery, with INDEX 2 written a second time to the data partition (as it is recovered) and updated to the index partition. When a tape as restored in FIG. 1C is mounted, the information of FILES A, B, and C may be restored as they were recorded in INDEX 2. However, data may only be restored up the time the last index was recorded, and it will not identify which of the restored files were in the midst of being updated at the time the index was recorded.

Figure 1D:
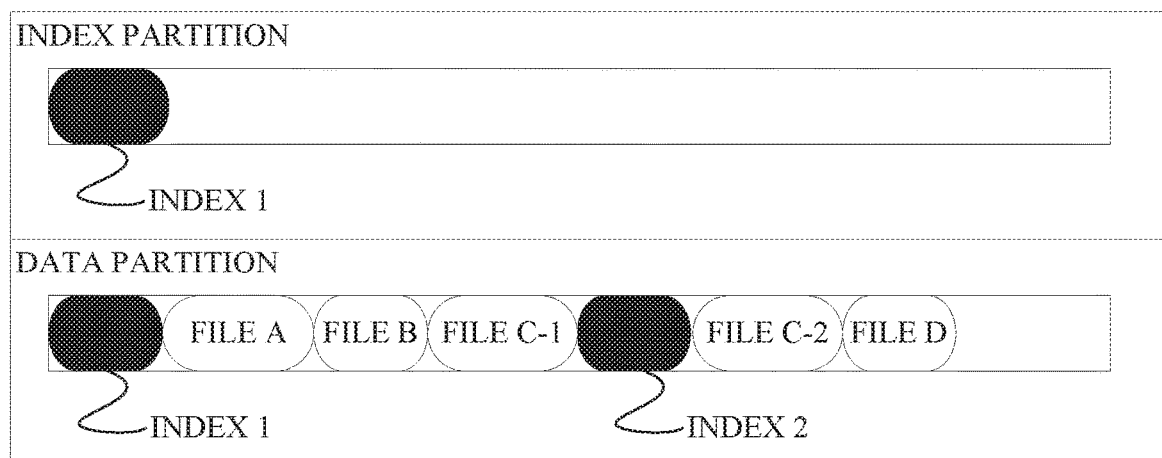
FIG. 1D depicts an example of a tape with an index storing an incomplete file update.

If, for instance, FILE C were being updated at the time INDEX 2 was being written, a situation such as appears in FIG. 1D may occur. In this case, if the data were recovered from INDEX 2, only FILE C-1 would be recovered, and the user may not be aware of it being a partial file. As an example of this, INDEX 2 may have been written while an application was automatically generating files by batch processing or a similar process, and the user subsequently cannot confirm the integrity of the file following recovery. In extreme cases, it may be necessary to recreate from scratch any file that was being generated by the batch processing.

Embodiments of the present disclosure provide a file storage system designed to periodically write a new index of the contents of the storage such that the contents of the index are identified with an update status, to maintain an up-to-date record of the contents of the storage. In some storage environments, such as a tape storage, this index may be periodically written in an appending manner, such that older versions of the index remain available for access if desired (e.g. roll back feature).

The index may further provide a starting point for data recovery following a data loss event, e.g. an interruption of power to the data storage. In the event that an index only provides for a partial recovery of a data file (e.g. the file was actively being edited at the time the index was generated), this disclosure provides for flagging the partial file.

When a file is opened by an application or process, it may be monitored or periodically checked to determine whether the file is being updated by the application or process. Alternatively, the application or process may be configured to provide updates to a memory or storage extension when updates are made to the file. If it is determined that the file is being updated, a flag may be placed on the file to indicate that changes are in process. When a new index is generated, and an entry for the file entered into the index, a flag may additionally be placed on the file entry in the index to indicate that changes were being made to the file when the index was generated (e.g. that a more current version of the file may exist than the version referenced in the index). In the event that the contents of the storage should need to be recovered through an index, this flag can provide an indication that only a partial file was recovered.

Embodiments of the present disclosure may generally be implemented by a software-based extension of the LTFS, but other implementations are possible, for example, execution by circuits of a storage device or other equivalents. Referring now to FIG. 2, depicted is an example method 200 of a process for flagging a data file engaged in an update process. The process may generally begin by receiving a request to open the data file, as in operation 205. The data file may be any computer file storing data for use by an application or system, and may also include program files, configuration files, directory files, etc.

In response to receiving the request to open the file, the extension creates a file descriptor for the requested file to be opened, and sets an update flag, associated with the file descriptor, to a value indicating that the file is not being updated, e.g. FALSE, as in operation 210. In this example, and throughout this disclosure, TRUE and FALSE are used respectively to represent a value indicating the file is being updated and a value indicating that the file is not being updated. It may generally be advantageous to use a binary indicator for the flag values, but if a more complex flagging system is desired, other values may be used.

The extension may carry out a conventional file opening process, as in operation 215. The file opening process may alternatively be carried out by the application, by a storage controller, or by a third-party program or system.

While the file is open and in use by the application, the extension may monitor the file for new update requests, as in operation 220. Monitoring the file for new update requests and assessing the file's update status may be a continuous real-time process, a periodic assessment executed at a predetermined interval, or a random check. In some embodiments, monitoring and/or assessment may be executed by a comparison, for instance using a checksum, between a current state of the file and a stored, "known" state of the file, such as the state of the file when it was last checked, while in other embodiments other file attributes may be used to assess a file's update status.

The extension may determine whether a new update request exists for the file, as in decision block 230. If the extension determines that a new update request has been received, the associated update flag for the file is set to a value indicating that the file is being updated, as in operation 235. As an example, the update flag may be set to a value of TRUE, as depicted in operation 235 of FIG. 2. The extension may also execute a conventional file update process to complete the update, as in operation 240. The update process may also be executed by the application itself, or another program or system component. The extension may also resume monitoring the file for new update requests, as in operation 220.

If, at decision block 230, the extension determines that a new update request has not been received, the extension may resume monitoring the file for new update requests, as in operation 220.

When the application closes the file, or sends a request for the file to be closed, the extension may delete the file descriptor, and the associated update flag, in response.

Referring now to FIG. 3, an example method 300 for writing an index to the tape file system is depicted. The method 300 may generally be executed by a software extension of the tape file system, but may be implemented in other ways as well.

In some embodiments, the method 300 may be triggered by receiving a request to write an index, as in operation 305. The request to write an index may be generated and transmitted based on a user command or may be automatically generated by the extension itself or another element of the tape file system, or a third party system, based on a predetermined periodicity for index writing. The request to write an index may be generated at random, or in response to a system event or status, e.g. a storage controller may monitor space remaining on the tape and generate a request to write an index when it determines that the tape is nearing capacity.

In response to receiving the request to write an index, the extension may review any collected index data, as in operation 310, and select a specific file to write to the index, as in operation 315. The collected index data may include at least a list or other summary of the files stored in the storage, e.g. allocation data from the last index written to the storage, and change data indicating new or removed files and changes to existing files. The collected index data may generally be stored in a memory integral to the computer system utilizing the tape or other storage and managed by a storage controller, a memory controller, the extension, etc. The specific file may be selected according to an alphabetical or numerical order the files are stored in, according to chronology, from oldest to newest or newest to oldest, randomly, etc.

In response to selecting a specific file to write to the index, the extension assesses whether the specific file has an update flag indicating that the file is being updated, e.g. the update flag is set to TRUE, as in this example depicted at decision block 320. If the extension determines that either the update flag does not indicate that the specific file is being updated or that the update flag is not present, then the method 300 may proceed to operation 325 and update the collected index data in memory as appropriate and write the selected file to the index in the storage in a conventional manner.

If, at decision block 320, the extension determines that the specific file's update flag indicates that the file is being updated, the extension proceeds to operation 330 and writes the specific file to the index in storage with an extended attribute to the file's entry in the index, the extended attribute indicating that the file was being updated at the time the index was written. The extension may also update the index in memory, as appropriate.

The extended attribute may generally be recorded in a format compliant with the storage system, e.g. an LTFS system has an internal format used for attributes or extended attributes. As a specific example, using LTFS format, the following pseudocode shows a value of "TRUE" set as an extended attribute called "ltfs.vendor.location.updated" that can be recorded in the index:

```
<name>file 1</name>
<length>5</length>
<readonly>false</readonly>
<creationtime>2015-05-28T22:52:07.632000000Z</creationtime>
<changetime>2015-05-28T22:52:34.479000000Z</changetime>
<modifytime>2015-05-28T22:52:07.632000000Z</modifytime>
<accesstime>2015-05-28T22:52:07.632000000Z</accesstime>
<backuptime>2015-05-28T22:52:07.632000000Z</backuptime>
<fileuid>3</fileuid>
<extendedattributes>
<xattr>
<key>ltfs.vendor.location.updated</key>
<value>TRUE</value>
</xattr>
</extendedattributes>
<extentinfo>
<extent>
<fileoffset>0</fileoffset>
<partition>b</partition>
<startblock>7</startblock>
<byteoffset>0</byteoffset>
<bytecount>5</bytecount>
</extent>
</extentinfor>
```

The extension may make an assessment, as in decision block 335, whether all the files recorded in the collected index data in the memory have been written to the index in the storage. If the extension determines that it has not written all the files in the collected index data to the index, it may select a new file to be written to the index, as in operation 315. If the extension determines it has written all the files in the collected index data to the index, then the method 300 may end, as in operation 340.

By tagging files that are being edited in the index using extended attributes in this way, files that may be incomplete can be explicitly presented to the user at the time the file is retrieved using the index. Presenting the file or files that were being edited may include: displaying a list of files that were being edited at the time the index is used to retrieve the contents of the storage, ensuring that a list of the files that were edited can be obtained by a user-issued command, creating a separate directory for files that were being edited, displaying a text box or other feature indicating the file was being updated at the time the index was written when the file is opened following recovery, etc.

In some embodiments, once an update flag is set to a value indicating that the file is being updated it may remain at the value indicating an update until the file is closed and the file descriptor is deleted.

Figure 4A:
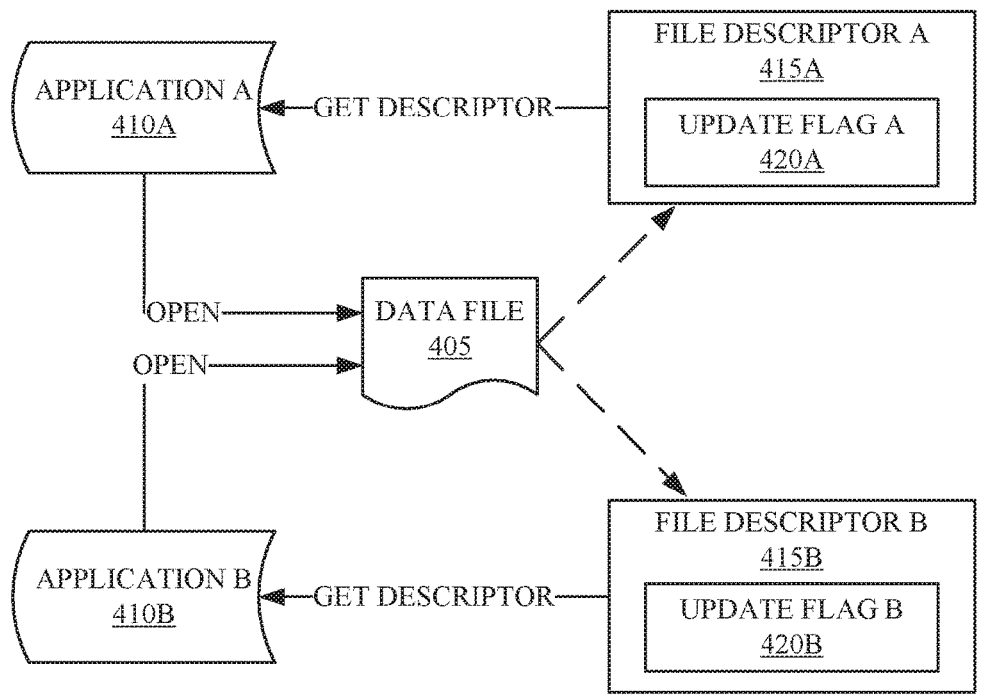
FIG. 4A depicts a graphic example of how the generation of file descriptors and update flags may appear, in accordance with embodiments of the present disclosure.

Referring now to FIG. 4A, a graphic depicting an example of how the generation of file descriptors and update flags may appear is shown. A single data file 405 is shown which is being accessed by two applications, application A 410A and application B 410B. Each of application A 410A and application B 410B may request to open the data file 405. The two requests may be received simultaneously, or at some time period apart from one another.

Regardless of when the requests are received, upon the receipt of each request the extension will generate a file descriptor for the data file 405, the file descriptor particular to the application sending the request to open the data file 405. For example, in FIG. 4A, file descriptor A 415A is generated in response to the request from application A 410A to open the data file 405 and file descriptor B 415B is generated in response to the request from application B 410B to the data file 405.

Each file descriptor may have an individual update flag, which may be set to an update value according to the associated application. For example, in FIG. 4A, application A 410A may begin to update the data file 405 immediately upon opening it, in which case update flag A 420A of file descriptor A 415A would be immediately set to a value indicating that the file is being updated. Meanwhile, application B 410B may open the data file 405 and make no updates to the data file 405, in which case the update flag 420B of file descriptor B 415B would remain at a value indicating the file is not being updated.

In this example, if a request to write an index to the storage were received by the extension, the data file 405 would be written to the index with an extended attribute indicating that the file was being updated at the time the index was written since an associated update flag indicated that the file was being updated, update flag A 420A in this example.

Figure 4B:
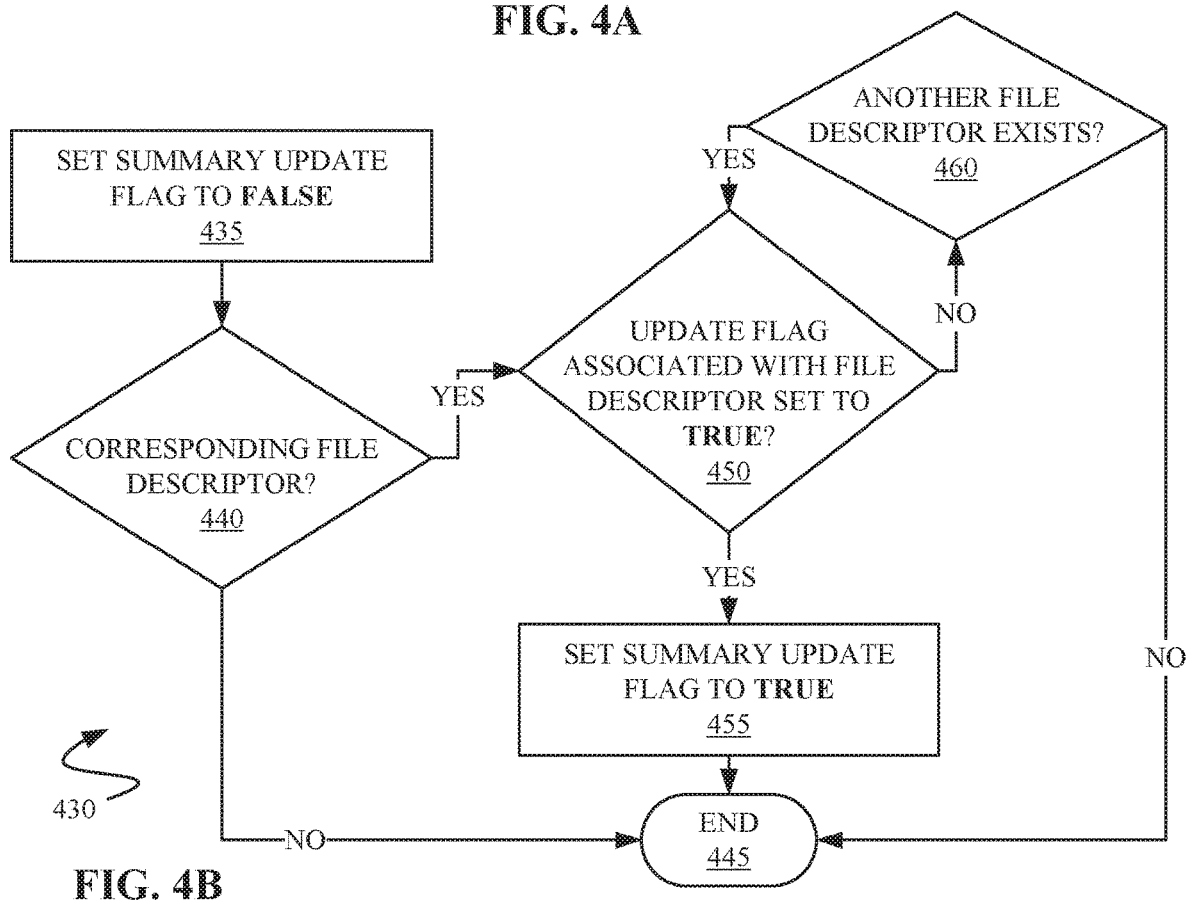
FIG. 4B depicts an example method of setting a summary update flag for a particular data file as a flowchart, in accordance with embodiments of the present disclosure.

In some embodiments, a summary update flag may be used to consolidate data from multiple update flags associated with a single data file. In such embodiments, determining whether to write an extended attribute for a file opened by multiple applications may be simplified, as only the summary update flag need be reviewed when writing the index to the storage. Referring now to FIG. 4B, an example method 430 of setting a summary update flag for a particular data file is depicted as a flowchart.

Initially, the extension may set the summary update flag of a file to a value indicating that the file is not being updated, e.g. FALSE, as in operation 435.

The extension may search the collected index data in the memory to determine whether a file descriptor associated with the same file as the summary update flag exists, as in decision block 440. If no such file descriptor exists, the method 430 may end, as in operation 445. If no file descriptors are found associated with the file, this may indicate to the extension that no application has the file open for editing, and therefore the summary update flag may remain FALSE, indicating that no extended attribute is needed when the file is written to the index.

If the extension does find that a file descriptor associated with the same file as the summary update flag does exist in the collected index data, the extension will assess whether the file descriptor contains an application specific update flag set to a value indicating that the file is being updated, e.g. set to TRUE, as in decision block 450. If the extension finds that the application-specific update flag is set to TRUE, the summary update flag is set to TRUE, as in operation 455. Once one application is found to be updating the file in question, no further file descriptors need to be checked. The method 430 may then end, as in operation 445.

If the extension finds that the file descriptor does not contain an update flag set to TRUE, it may assess whether the collected index data contains any other file descriptors associated with the same file as the summary update flag, as in decision block 460. If no other file descriptors are found, the method 430 may end, as in operation 445. If another file descriptor is found, the extension assesses whether it contains an update flag set to TRUE, as in decision block 450.

Referring now to FIG. 5, shown is a high-level block diagram of an example computer system (i.e., computer) 500 that may be used in implementing one or more of the methods or modules, and any related functions or operations, described herein (e.g., using one or more processor circuits or computer processors of the computer), in accordance with embodiments of the present disclosure. In some embodiments, the major components of the computer system 500 may comprise one or more CPUs 502, a memory subsystem 504, a terminal interface 512, an I/O (Input/Output) device interface 514, a storage interface 516, and a network interface 518, all of which may be communicatively coupled, directly or indirectly, for inter-component communication via a memory bus 503, an I/O bus 508, and an I/O bus interface unit 510.

In some embodiments, the storage interface 516 may serve to connect to the tape storage 520. As described above, the tape storage 520 will generally have at least an index partition 522 and a data partition 524.

The computer system 500 may contain one or more general-purpose programmable central processing units (CPUs) 502A, 502B, 502C, and 502D, herein generically referred to as the CPU 502. In some embodiments, the computer system 500 may contain multiple processors typical of a relatively large system; however, in other embodiments the computer system 500 may alternatively be a single CPU system. Each CPU 502 may execute instructions stored in the memory subsystem 504 and may comprise one or more levels of on-board cache.

In some embodiments, the memory subsystem 504 may comprise a random-access semiconductor memory, storage device, or storage medium (either volatile or non-volatile) for storing data and programs. In some embodiments, the memory subsystem 504 may represent the entire virtual memory of the computer system 500, and may also include the virtual memory of other computer systems coupled to the computer system 500 or connected via a network. The memory subsystem 504 may be conceptually a single monolithic entity, but, in some embodiments, the memory subsystem 504 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 504 may contain elements for control and flow of memory used by the CPU 502. This may include a memory controller 505 or the collected index data 506.

Although the memory bus 503 is shown in FIG. 5 as a single bus structure providing a direct communication path among the CPUs 502, the memory subsystem 504, and the I/O bus interface 510, the memory bus 503 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 500 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 500 may be a multi-user mainframe computer system, a single-user system, or a server computer or similar device that has little or no direct user interface, but receives requests from other computer systems (clients). Further, in some embodiments, the computer system 500 may be implemented as a desktop computer, portable computer, laptop or notebook computer, tablet computer, pocket computer, telephone, smart phone, mobile device, or any other appropriate type of electronic device.

It is noted that FIG. 5 is intended to depict the representative major components of an exemplary computer system 500. In some embodiments, however, individual components may have greater or lesser complexity than as represented in FIG. 5, components other than or in addition to those shown in FIG. 5 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for writing indexes in a storage of a file system, the method comprising:
  receiving, from a first application, a first request to open a first file of a plurality of files in the storage, the storage comprising an index partition and a data partition, wherein indexes of the file system are recorded to the index partition, and wherein the indexes and data body of the file system are recorded to the data partition in an appending manner;

creating a first file descriptor for the first file, the first file descriptor including a first update flag that references the first file;

determining that the first file is being updated by the first application;

in response to determining that the first file is being updated by the first application, setting the first update flag in the first file descriptor to a value representative of the first file being updated;

assessing both the first file descriptor for the first file and a second file descriptor for the first file to determine if one of the first update flag or a second update flag in the second file descriptor is set to the value representative of the first file being updated;

receiving a request to write an index of the file system;

determining, in response to receiving the request to write an index, that a specific file from the plurality of files is being updated by determining that the specific file is the first file and a summary update flag referencing the first file is set to the value indicating that the first file is being updated, wherein the summary update flag is set to the value indicating that the first file is being updated in response to either the first update flag or the second update flag being determined to be set to the value representing that the first file is being updated; and in response to determining that the specific file is being updated, writing, in the storage, an index including an extended attribute for the specific file, the extended attribute indicating that the specific file was being updated at the time the index was written.

2. The method of claim 1, further comprising:

parsing the index of the file system in response to a request to mount the storage and open the first file and checking the first extended attribute in the index; and presenting to a user the first file and a display that corresponds to the first extended attribute indicative of the fact that the first file was being updated at the time the index was written.

3. The method of claim 1, further comprising:

receiving, from the first application, a second request to open a second file of the plurality of files in the storage;

creating a file descriptor for the second file, the file descriptor for the second file including an update flag that references the second file;

determining that the second file is being updated by the first application; and in response to determining that the second file is being updated by the first application, setting the update flag that references the second file to a value representing that the second file is being updated.

4. The method of claim 3, further comprising:

determining, in response to receiving the request to write an index, that the second file is being updated based on the update flag that references the second file being set to the value indicating that the second file is being updated, wherein the index further comprises a second extended attribute for the second file, the second extended attribute indicating that the second file was being updated at the time the index was written.

5. The method of claim 1, further comprising:

receiving, from a second application, a second request to open the first file in the storage;

creating the second file descriptor for the first file, the second file descriptor including the second update flag that references the first file;

determining that the first file is being updated by the second application; and in response to determining that the first file is being updated by the second application, setting the second update flag in the second file descriptor to the value representing that the first file is being updated.

6. The method of claim 5, further comprising:

maintaining collected index data of the file system in a memory, the collected index data comprising the summary update flag that references the first file.

7. The method of claim 1, further comprising:

deleting the first file descriptor in response to a request from the first application to close the first file.

8. The method of claim 1, wherein the request to write an index is issued automatically according to a predetermined period.

9. The method of claim 1, wherein the request to write an index is issued in response to a user calling a predetermined function.

10. The method of claim 1, wherein the storage is a tape.

11. A computer system for writing indexes in a storage of a file system, the computer system comprising:

a memory;

a storage, the storage having an index partition and a data partition, wherein indexes of the file system are recorded to the index partition, and wherein the indexes and data body of the file system are recorded to the data partition in an appending manner; and a processor in communication with the memory and the storage;

instructions saved in the memory that stores the instructions, the instructions executed by the processor configured to perform the method by using the instructions for employing the method, the method comprising:

receiving, from a first application, a first request to open a first file of a plurality of files in the storage;

creating, in the memory, a first file descriptor for the first file, the first file descriptor including a first update flag that references the first file;

determining that the first file is being updated by the first application;

in response to determining that the first file is being updated by the first application, setting the first update flag in the first file descriptor to a value representing that the first file is being updated;

assessing both the first file descriptor for the first file and a second file descriptor for the first file to determine if one of the first update flag or a second update flag in the second file descriptor is set to the value representative of the first file being updated;

receiving a request to write an index of the file system in the storage;

determining, in response to receiving the request to write an index, that a specific file from the plurality of files is being updated by determining that the specific file is the first file and a summary update flag referencing the first file is set to the value indicating that the first file is being updated, wherein the summary update flag is set to the value indicating that the first file is being updated in response to either the first update flag or the second update flag being determined to be set to the value representing that the first file is being updated; and in response to determining that the specific file is being updated, writing, in the storage, an index including an extended attribute for the specific file, the extended attribute indicating that the specific file was being updated at the time the index was written.

12. The system of claim 11, wherein the method further comprises:
   receiving, from a second application, a second request to open the first file in the storage;
   creating the second file descriptor for the first file, the second file descriptor including the second update flag referencing the first file;
   determining that the first file is being updated by the second application;
   in response to determining that the first file is being updated by the second application, setting the second update flag in the second file descriptor to the value representing that the file is being updated; and
   maintaining collected index data of the file system in the memory, the collected index data comprising the summary update flag referencing the first file.

13. The system of claim 11, wherein the method further comprises:
   deleting the first file descriptor in response to a request from the first application to close the first file.

14. A computer program product for writing indexes in a storage of a file system, the computer program product comprising a computer readable storage medium having program instructions embodied therewith, wherein the computer readable storage medium is not a transitory signal per se, the program instructions executable by a processor to perform a method comprising:
   receiving, from a first application, a first request to open a first file in the storage, the storage including an index partition and a data partition, wherein indexes of the file system are recorded to the index partition and the indexes and data body of the file system are recorded to the data partition in an appending manner;
   creating a first file descriptor for the first file, the first file descriptor including a first update flag that references the first file;
   determining that the first file is being updated by the first application;
   in response to determining that the first file is being updated by the first application, setting the first update flag in the first file descriptor to a value representing that the first file is being updated;
   assessing both the first file descriptor for the first file and a second file descriptor for the first file to determine if one of the first update flag or a second update flag in the second file descriptor is set to the value representative of the first file being updated;
   receiving a request to write an index of the file system to the storage;
   determining, in response to receiving the request to write an index, that a specific file from the plurality of files is being updated by determining that the specific file is the first file and a summary update flag referencing the first file is set to the value indicating that the first file is being updated, wherein the summary update flag is set to the value indicating that the first file is being updated in response to either the first update flag or the second update flag being determined to be set to the value representing that the first file is being updated; and
   in response to determining that the specific file is being updated, writing, in the storage, an index including an extended attribute for the specific file, the extended attribute indicating that the specific file was being updated at the time the index was written.

* * * * *